United States Patent Office 3,020,306
Patented Feb. 6, 1962

3,020,306
PHOSPHORUS COMPOUNDS
Gail H. Birum, Dayton, Ohio, assignor to Monsanto Chemical Company, St. Louis, Mo., a corporation of Delaware
No Drawing. Filed Sept. 22, 1959, Ser. No. 841,450
12 Claims. (Cl. 260—461)

This invention relates to organic phosphorus compounds. More particularly this invention relates to aromatic pentavalent phosphorus compounds.

An object of this invention is to provide a new and valuable class of aromatic pentavalent phosphorus esters.

A more specific object is to provide a new and valuable class of phosphinylhydrocarbyloxy diaromatic pentavalent phosphorus esters.

Other objects of this invention will appear from the description hereinafter.

In copending application, S.N. 780,224, filed December 15, 1958, there are disclosed and claimed new compounds of the general formula

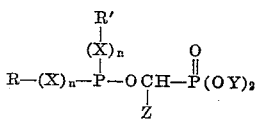

wherein R and R' are selected from the group consisting of (1) aromatic hydrocarbyl radicals which are free from aliphatic unsaturation and which contain from 6 to 12 carbon atoms and (2) said aromatic hydrocarbyl radicals carrying halogen as substituents; X is selected from the group consisting of —O— and —S—; n is an integer of from 0 to 1; Z is selected from the class consisting of hydrogen and hydrocarbyl radicals which are free from aliphatic unsaturation and contain from 1 to 11 carbon atoms; and Y is selected from the group consisting of alkyl and haloalkyl radicals having from 1 to 12 carbon atoms.

These compounds can be described as phosphinylhydrocarbyloxy phosphites, phosphonites, or phosphinites, depending upon the presence of the X element in the above indicated positions. They can also be classified as phosphite-phosphonates, phosphonite-phosphonates, or phosphinite-phosphonates, which description illustrates the types of phosphorus linkages in the compounds.

According to the present invention, there are provided phosphinylhydrocarbyloxy esters of pentavalent phosphorus compounds which have the general formula

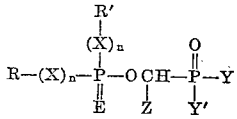

wherein R and R' are selected from the group consisting of (1) aromatic hydrocarbyl radicals which are free from aliphatic unsaturation and contain from 6 to 12 carbon atoms, (2) said aromatic hydrocarbyl radicals carrying halogen as substituents; X is selected from the group consisting of —O— and —S—; n is an integer of from 0 to 1; E is selected from the group consisting of oxygen and sulfur; Z is selected from the group consisting of hydrogen and hydrocarbyl radicals which are free from aliphatic unsaturation and contain from 1 to 11 carbon atoms, said Z radicals permissibly containing alkoxy or aryloxy substituents having from 1 to 8 carbon atoms; and Y and Y' are each selected from the group consisting of hydrocarbyl, halohydrocarbyl, hydrocarbyloxy, and halohydrocarbyloxy radicals which are free from aliphatic unsaturation and contain from 1 to 12 carbon atoms. The term "hydrocarbyl," as used in this case, is defined in Degering, An Outline of Organic Chemistry, 5th edition (1947), page 135, as follows: "Hydrocarbyl is the radical obtained by the loss of a hydrogen atom from any hydrocarbon."

In terms of types of phosphorus linkages which can exist in the compounds of this invention, they can be classified as phosphate-phosphonates, phosphate-phosphinates, and phosphate-phosphine oxide derivatives; phosphonate-phosphonates, phosphonate-phosphinates, or phosphinate-phosphine oxide derivatives; and phosphinate-phosphonates, phosphinate-phosphinates, or phosphinate-phosphine oxide derivatives. For example,

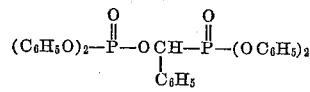

is α-(diphenoxyphosphinyl)benzyl diphenyl phosphate and is classified as a phosphate-phosphonate; whereas

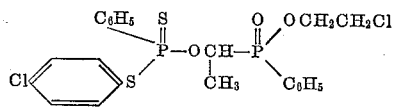

is O-1-[(2-chloroethoxy)phenylphosphinyl]ethyl S-p-chlorophenyl phenylphosphonodithioate and is classified as a phosphonate-phosphinate; and

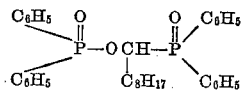

is 1-(diphenylphosphinyl)nonyl diphenylphosphinate, and is classified as a phosphinate-phosphine oxide.

The compounds of this invention can be prepared by treating phosphinylhydrocarbyloxy esters of trivalent phosphorus compounds containing two aromatic hydrocarbyl or halohydrocarbyl radicals, or mixtures thereof, with an oxidizing agent or sulfur so as to obtain the respective phosphate, phosphonate or phosphinate when an oxidizing agent is used, and the respective phosphorothioate, phosphonothioate, or phosphinothioate when sulfur is used. Thus, for example, by contacting a bis(haloaryl)phosphite-phosphonate such as 1-(dipropoxyphosphinyl)butyl bis(4-chlorophenyl)phosphite with an oxidizing agent, there is produced the respective bis(haloaryl)phosphate-phosphonate, i.e., 1-(dipropoxyphosphinyl)butyl bis(4-chlorophenyl)phosphate. When sulfur is added to the above phosphite, 1-(dipropoxyphosphinyl)butyl bis(4-chlorophenyl)phosphorothioate is prepared.

To further illustrate the reactants and products of our invention, we can react the following phosphite-phosphonates, for example, with an oxidizing agent or with sulfur to obtain the indicated phosphate-phosphonates:

1-(dimethoxyphosphinyl)pentyl bis(p-tolyl) phosphite to yield 1-(dimethoxyphosphinyl)pentyl bis(p-tolyl) phosphate or phosphorothioate, O-α[(6-chlorohexyloxy)hexyloxyphosphinyl]benzyl bis-(S-mesityl)phosphorodithioite to yield α-[(6-chlorohexyloxy)hexyloxyphosphinyl]benzyl bis(S-mesityl) phosphorodithioate or phosphorotrithioate.

When an aromatic phosphite-phosphinate is treated with an oxidizing agent or with sulfur, the respective aromatic phosphate-phosphinate or phosphorothioate-phosphinate product is obtained. Examples of such reactants and products are:

1-(ethylethoxyphosphinyl)methyl bis(4-methylphenyl) phosphite to yield 1-(ethylethoxyphosphinyl)methyl bis(4-methylphenyl) phosphate or phosphorothioate, O-α-[(phenyl)propoxyphosphinyl]benzyl O-2-phenylethyl S-benzyl phosphorothioite to yield O-α-[(phenyl)propoxyphosphinyl]benzyl O-2-phenylethyl S-benzyl phosphorothioate or phosphorodithioate, and O-1-[butyl(2-chlorobutoxy)phosphinyl]ethyl S-β-naphthylmethyl S-phenyl phosphorodithioite to yield O-1-[butyl(2-chlorobutoxy)-phosphinyl]ethyl S-β-naphthylmethyl S-phenyl phosphorodithioate or phosphorotrithioate.

Similarly, when an aromatic phosphite-phosphine oxide is treated with an oxidizing agent or with sulfur, the respective phosphate-phosphine oxides are prepared. Examples are:

1-(dioctylphosphinyl)propyl diphenyl phosphite to yield 1-(dioctylphosphinyl)propyl diphenyl phosphate or phosphorothioate, O-α-[bis(4-methylphenyl)phosphinyl]benzyl O-α-naphthyl S-p-tolyl phosphorothioite to yield O-α-[bis(4-methylphenyl)phosphinyl]benzyl O-α-naphthyl S-p-tolyl phosphorothioate or phosphorodithioate, and O - 1 - [(2,4 - dimethylphenyl)(α - naphthyl)phosphinyl]hexyl S,S-bis(2-phenylethyl) phosphorodithioite to yield O - 1 - [(2,4 - dimethylphenyl)(α - naphthyl)phosphinyl]hexyl S,S-bis(2-phenylethyl) phosphorodithioate or phosphorotrithioate.

Aromatic phosphonite-phosphinate compounds react with an oxidizing agent or with sulfur to obtain the respective aromatic phosphonate-phosphinate compounds. Examples of such reactants and the resulting products are:

1-[(propoxy)phenylphosphinyl]undecyl p-cumyl benzylphosphonite to yield 1-[(propoxy)phenylphosphinyl]undecyl O-p-cumyl benzylphosphonate or phosphonothioate, O - α - [(α - naphthyloxy)benzylphosphinyl] - 2,4,6 - trimethylbenzyl S-(4-fluorophenyl) 4-fluorophenylphosphonothioite to yield O-α-[(α-naphthyloxy)benzylphosphinyl]-2,4,6-trimethylbenzyl S-(4-fluorophenyl) 4-fluorophenylphosphonothioate or -phosphonodithioate, and O - 1 - [(ethoxy)nonylphosphinyl] - 2 - ethylhexyl O - pentachlorophenyl p-tolylphosphonite to yield O-1-[(ethoxy)nonylphosphinyl] - 2 - ethylhexyl O - pentachlorophenyl p-tolylphosphonate or -phosphonothioate.

Examples of reactants used and products obtained when a phosphonite-phosphonate type compound is treated with an oxidizing agent or with sulfur are:

α-[bis(2-chloroethoxy)phosphinyl]-β-naphthyl p h e n y l phenylphosphonite to yield O-α-[bis(2-chloroethoxy)phosphinyl]-β-naphthyl O-phenyl phenylphosphonate or -phosphonothioate, O-1-[p-tolyloxy)-2-ethylhexyloxyphosphinyl]hexyl S-(α-naphthyl) phenylphosphonothioite to yield O-1-[p-tolyloxy)-2-ethylhexyloxyphosphinyl]hexyl S-(α-naphthyl) phenylphosphonothioate or -phosphonodithioate, and O-1-(diphenoxyphosphinyl)nonyl O-[p-(2-ethoxy)phenyl] phenylphosphonite to yield O-1-(diphenoxyphosphinyl)nonyl O-[p-(2-ethoxy)phenyl] phenylphosphonate or -phosphonothioate.

When an aromatic phosphonite-phosphine oxide derivative is treated with an oxidizing agent or with sulfur, aromatic phosphonate-phosphine oxides are obtained. Examples of such reactants used and products obtained are:

O-α-[bis(2-chlorobutyl)phosphinyl]biphenylyl S-(2-phenylethyl) p-tolylphosphonothioite to yield O-α-[bis(2-chlorobutyl)phosphinyl]biphenylyl S-(2-phenylethyl) p-tolylphosphonothioate or -phosphonodithioate, 1-[(phenyl)(p-tolyl)phosphinyl]pentyl benzyl benzylphosphonite to obtain O-1-[(phenyl)(p-tolyl)phosphinyl]pentyl O-benzyl benzylphosphonate or -phosphonothioate, and O-1-[bis(4-fluorophenyl)phosphinyl]-4-ethylhexyl S-(2,4,6-trimethylphenyl) 2,4,6-trimethylphenylphosphonothioite to obtain O-1-[bis(4-fluorophenyl)phosphinyl]-4-ethylhexyl S-(2,4,6-trimethylphenyl) 2,4,6-trimethylphenylphosphonothioate or -phosphonodithioate.

Also included within the scope of the invention are the products obtained when an aromatic phosphinite-phosphonate, phosphinite-phosphinate, or phosphinite-phosphine oxide is treated with an oxidizing agent or with sulfur. Examples of reactants used to obtain phosphinate-phosphonate products are:

1-[bis(2-bromohexyloxy)phosphinyl]propyl (phenyl)benzylphosphinite to obtain 1-[bis(2-bromohexyloxy)phosphinyl]propyl (phenyl)benzylphosphinate or -phosphinothioate.

α-(diphenoxyphosphinyl)-p-propylbenzyl bis(α-naphthyl) phosphinite to obtain α-(diphenoxyphosphinyl)-p-propylbenzyl bis(α-naphthyl)phosphinate or -phosphinothioate, and 1 - [(4 - chlorophenyl)(2 - chloroethyl)phosphinyl]ethyl diphenylphosphinite to obtain 1-[(4-chlorophenyl)(2-chloroethyl)phosphinyl] ethyl diphenylphosphinate, or -phosphinothioate.

Examples of phosphinate-phosphinate products obtained when a phosphinite-phosphinate compound is treated with an oxidizing agent or with sulfur are:

1-[(propoxy)propylphosphinyl]ethyl diphenylphosphinite to obtain 1-[(propoxy)propylphosphinyl]ethyl diphenylphosphinate or -phosphinothioate, α - [(2 - chloro - 3 - bromopropyloxy)phenylphosphinyl]-p-methylbenzyl bis(2-chloro-p-tolyl)phosphinite to obtain O - α - [(2 - chloro - 3 - bromopropyloxy)phenylphosphinyl]-p-methylbenzyl bis(2-chloro-p-tolyl)phosphinate or -phosphinothioate, and 1 - [(4 - chloro - 2,6 - dimethylphenyl)hexyloxyphosphinyl]decyl (β-naphthyl) phenylphosphinite to obtain 1 - [bis(4 - chloro - 2,6 - dimethylphenyl)hexyloxyphosphinyl]decyl (β-naphthyl)phenylphosphinate or -phosphinothioate.

As stated above, phosphinite-phosphine oxide compounds react with an oxidizing agent or with sulfur to produce phosphinate-phosphine oxide derivatives. Examples of such reactants and the products obtained are:

1-(dimethylphosphinyl)octyl dibenzylphosphinite to obtain 1-(dimethylphosphinyl)octyl dibenzylphosphinate or -phosphinothioate, α-(diphenylphosphinyl)-α-naphthyl diphenylphosphinite to obtain α-(diphenylphosphinyl)-α-naphthyl diphenylphosphinate or -phosphinothioate, and 1 - [(2 - chloro - α - naphthyl)(2 - bromoethyl)phosphinyl]-3-phenylpropyl dibiphenylylphosphinite to obtain 1-[(2-chloro-α-naphthyl)(2-bromoethyl)phosphinyl]-3-phenylpropyl dibiphenylylphosphinate or -phosphinothioate.

We have found that a number of oxidizing agents will convert the trivalent phosphorus atom of the aromatic phosphite, phosphonite, and phosphinite starting material to the pentavalent state and supply an oxygen atom thereto without disturbing or varying the linkages of that phosphorus atom to the other groups of the molecule. Some of those which are preferred for making the compounds of this invention are the peroxycarboxylic acids, both aromatic and aliphatic, hydroperoxides, hydrogen peroxide, ozone, oxygen, and nitrogen oxides such as nitrogen tetroxide. Air may be used but it is not preferred. Although the more common inorganic oxidizing agents such as $KMnO_4$, $CrO_3$, etc., would accomplish the oxidation, they are not desirable for reasons of expense, salt byproduct complications, etc. To prepare the phosphorothioates, phosphonothioates, and phosphinothioates of this invention, elemental sulfur in any of its known forms is used. It may be in the form of flowers, powder, crystalline, amorphous, etc. In either case, i.e., whether the phosphate, phosphonate, phosphinate or the phosphorothioate, phosphonothioate, phosphinothioate compounds are being prepared, the respective trivalent phosphorus compound is usually contacted with a stoichiometric quantity or slight excess of oxidizing agent or sulfur while stirring the mixture to insure complete reaction. Any excess oxidizing agent or sulfur can be recovered by known physical means, e.g., filtration, volatilization, extraction, etc.

Reaction between the trivalent phosphorus reactants and the oxidizing agent or sulfur can take place at room temperature. However, when using the highly reactive oxidizing agents such as hydrogen peroxide and ozone, it is oftentimes preferred to cool the mixture to say, −70° C. to 20° C., depending upon which reactants are combined, to control the resulting exothermic reaction. On the other hand, reaction of the respective phosphite, phosphonite, or phosphinite compound with sulfur is usually most practically accomplished by warming the reactants to from 50° C. to 180° C. to insure complete reaction.

The oxidation or thionation of the phosphite, phosphonite, and phosphinite starting materials is readily conducted in the absence of an inert solvent, or catalyst. However, solvents and catalyst may be employed. The use of solvents is particularly advantageous when working with the highly active oxidizing agents or the more viscous phosphorus compounds. Such solvents may be, e.g., benzene, toluene, xylene, dioxane, alkylene halides such as methylene chloride and methylene bromide, hexane, and mixtures thereof. No particular order or method of contacting the reactants need be employed. However, I usually add the oxidizing agent or the sulfur portionwise to the phosphite, phosphonite, or phosphinite reactant to avoid unduly exothermic reactions and waste of reactants.

The products of this invention are stable, usually high-boiling materials which range from viscid liquids to waxy, or crystalline solids. They are advantageously used as plasticizers, functional fluids, and dielectrics. They are useful as biological toxicants in quantities ranging from 1 to 10 parts per million to 10,000 parts per million depending upon the organism treated. They are useful as lead scavengers in leaded gasolines in quantities ranging from 0.05 to 10.0 moles per mole of lead in the gasoline. They are useful as flame-proofing agents and heat and light stabilizers in many polymeric materials such as urea-formaldehyde, phenol-formaldehyde, epoxy, and other oxygen containing resins, in polyester compositions such as polyterephthalate, polyacrylonitrile and polyamide polymers and in condensation products used to make fibers, in polyurethane, polystyrene, and other foam materials, in rubber based emulsion type coatings, as well as in cellulosic and hydrocarbon materials, in quantities ranging from 0.50 to 25.0% or more by weight, depending upon the materials to which they are added. In the higher concentration ranges, say, in concentrations which may be equivalent by weight to the weight of the polymeric material, plasticizing properties will likewise often be demonstrated. They are also useful as gear and lubricant oil and grease additives.

*Example 1*

1-(diethoxyphosphinyl)propyl diphenyl phosphite, 31.3 g. (0.06 mole) and 30 ml. of methylene chloride were placed in a 100 ml. flask equipped with a stirrer with a gas dispersion inlet, Dry Ice condenser, and a thermometer. This was cooled to −20° C. and a stream of oxygen-ozone was passed into the stirred mixture. The rate of output of ozone was 33 mg. per liter of oxygen-ozone mixture. The oxygen-ozone mixture addition took place over 30 minutes and at the end of that time no more ozone was being absorbed as indicated by an ozone meter. The system was purged with nitrogen while the mixture was allowed to warm to room temperature. The mixture was then distilled under water pump vacuum to 40° C. to remove the methylene chloride solvent. The residue was concentrated to 100° C./0.15 mm. to obtain 31.4 g.(97.3% yield) of pale yellow viscous liquid which was 1-(diethoxyphosphinyl)propyl diphenyl phosphate.

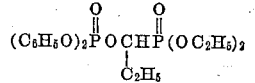

*Example 2*

To 34.2 g. (0.066 mole) of 1-[(phenyl)ethoxyphosphinyl]-2-ethylhexyl diphenyl phosphite in a flask equipped as in Example 1 there was added 1.8 g. of sulfur, and the resulting mixture was stirred at room temperature (23° C.) for 10 minutes during which time a 3° C. rise in temperature of the mixture was noted. The mixture was then heated while stirring to 135° C. The viscous product was O-1-[(phenyl)-ethoxyphosphinyl]-2-ethylhexyl O,O-diphenyl phosphorothioate.

Phosphates and phosphorothioates containing dihydrocarbylphosphinylhydrocarbyloxy radicals are also readily prepared by oxidizing or thionating a dihydrocarbylphosphinylhydrocarbyloxy phosphite.

*Example 3*

To an ice-cooled mixture consisting of 22.1 g. (0.10 mole) of diphenylphosphinous chloride and 16.6 g. (0.10 mole) of triethyl phosphite there was added, during 6 minutes, 7.0 g. (0.12 mole) of propionaldehyde. Heat of reaction was evidenced during the addition, and when cooling was discontinued, the reaction temperature increased spontaneously to 33° C. The colorless reaction mixture was warmed to 65° C. and then concentrated to a pot temperature of 82° C./0.05 mm., to give 37.5 g. (99% yield) of 1-(diethoxyphosphinyl) propyl diphenylphosphinite, which reacts readily with sulfur to produce O-1-(diethoxyphosphinyl)propyl diphenylphosphinothioate.

*Example 4*

A 1.3 g. portion of sulfur was added to 25 g. (0.049 mole) of 1-[bis(2-chloropropoxy)phosphinyl]propyl diphenyl phosphite, and the resulting mixture was stirred as in the prior examples and then heated to 135° C. and allowed to cool to 90° C. No sulfur had precipitated so 0.15 g. more of sulfur was added and heating continued to 140° C. The pale yellow liquid product was O-1-[bis-(2-chloropropoxy)phosphinyl]propyl O,O-diphenyl phosphorothioate.

*Example 5*

To 39.3 g. (0.0766 mole) of O-1-(diethoxyphosphinyl)-propyl S,S-bis(p-chlorophenyl) phosphorodithioite there was added 2.1 g. of sulfur at room temperature. The resulting mixture was stirred for 15 minutes and then heated slowly to 140° C., and cooled to 55° C. Two-tenths of a gram more of sulfur was added, and then the mixture was heated to 156° C. to insure complete reaction. O-1-(diethoxyphosphinyl)propyl S,S-bis(p-chlorophenyl) phosphorotrithioate was obtained as a clear yellow liquid product.

*Example 6*

In a 500 ml. flask equipped with a stirrer, thermometer, condenser with drying tube, and a dropping funnel, α-(diethoxyphosphinyl)-p-methoxybenzyl diphenyl phosphite, prepared by reacting 19.5 g. (0.143 mole) of p-anisaldehyde, 23.8 g. (0.143 mole) of triethyl phosphite, and 36.1 g. (0.143 mole) of diphenoxy phosphorus monochloride, and removing the ethyl chloride by-product, was treated with 3.9 g. of sulfur, and the mixture was stirred at room temperature for 10 minutes during which time a 2° C. rise in temperature from room temperature (24° C.) took place in the mixture. The mixture was then successively heated to 135° C., while stirring, cooled to 70° C., treated with 0.3 g. more of sulfur and then heated again to 130° C., to obtain O-α-

(diethoxyphosphinyl) - p - methoxybenzyl O,O-diphenyl phosphorothioate as a yellow, very viscous liquid.

*Example 7*

A 1.8 g. portion of sulfur was added to 35.3 g. (0.0675 mole) of 1-(dihexyloxyphosphinyl)propyl diphenyl phosphite in a reaction flask equipped as in Example 1, and the resulting mixture was stirred for 10 minutes during which time a 2° C. rise in temperature from room temperature took place. The mixture was heated to 135° C. as in the prior examples, cooled to 60° C., 0.2 g. more of sulfur added, and heating continued to 140° C. The product was substantially O-1-(dihexyloxyphosphinyl) propyl O,O-diphenyl phosphorothioate.

I claim:

1. Compounds of the formula

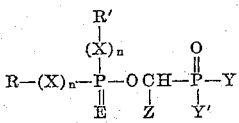

wherein R and R' are selected from the group consisting of aromatic hydrocarbon radicals which are free from aliphatic unsaturation and have from 6 to 12 carbon atoms, and said aromatic hydrocarbon radicals carrying halogen as substituents; X is selected from the group consisting of —O— and —S—; $n$ is an integer of from 0 to 1; E is selected from the group consisting of oxygen and sulfur; Z is selected from the group consisting of hydrogen, aromatic hydrocarbon radicals of from 6 to 12 carbon atoms, said aromatic hydrocarbon radicals having lower alkoxy groups as substituents, and alkyl radicals having from 1 to 11 carbon atoms; Y and Y' are selected from the group consisting of alkoxy and haloalkoxy radicals having from 1 to 12 carbon atoms, and aromatic hydrocarbon and aromatic hydrocarbonoxy radicals which have from 6 to 12 carbon atoms.

2. Compounds of the formula

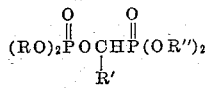

wherein R is an aryl radical having from 6 to 12 carbon atoms; R' is an alkyl radical having from 1 to 11 carbon atoms; and R" is an alkyl radical having from 1 to 12 carbon atoms.

3. Compounds of the formula

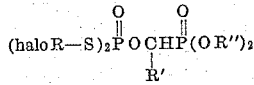

wherein haloR is a halogen-substituted aryl radical having from 6 to 12 carbon atoms; R' is an alkyl radical having from 1 to 11 carbon atoms and R" is an alkyl radical having from 1 to 12 carbon atoms.

4. Compounds of the formula

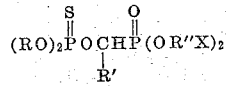

wherein R is an aryl radical having from 6 to 12 carbon atoms; R' is an alkyl radical having from 1 to 11 carbon atoms; and R"X is a halogen-substituted alkyl radical having from 1 to 12 carbon atoms.

5. Compounds of the formula

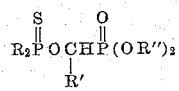

wherein R is an aryl radical having from 6 to 12 carbon atoms; R' is an alkyl radical having from 1 to 11 carbon atoms; R" is an alkyl radical having from 1 to 12 carbon atoms.

6. O-1-[(phenyl)ethoxyphosphinyl]-2-ethylhexyl O,O-diphenyl phosphorothioate.

7. O-1-(diethoxyphosphinyl)propyl O,O-diphenyl phosphate.

8. O-1-(diethoxyphosphinyl)propyl diphenylphosphinothioate.

9. O-1-[bis(2-chloropropoxy)phosphinyl]propyl O,O-diphenyl phosphorothioate.

10. O-1-(diethoxyphosphinyl)propyl S,S-bis(p-chlorophenyl) phosphorotrithioate.

11. O-α-(diethoxyphosphinyl) - p-methoxybenzyl O,O-diphenyl phosphorothioate.

12. O-1-(dihexyloxyphosphinyl)propyl O,O - diphenyl phosphorothioate.

References Cited in the file of this patent

Arbuzov et al.: Zhur Obschei Chemie U.S.S.R., 29, 2617–2622 (1959).